United States Patent
Guyomard et al.

(10) Patent No.: US 7,744,835 B2
(45) Date of Patent: Jun. 29, 2010

(54) NANOSTRUCTURE MATERIAL, METHOD FOR THE PREPARATION THEREOF

(75) Inventors: Dominique Guyomard, Sautron (FR); Joël Gaubicher, Nantes (FR); Marc Deschamps, Quimper (FR); Matthieu Dubarry, Honolulu, HI (US); Philippe Moreau, Saint Mars du Désert (FR)

(73) Assignees: Batscap, Ergue-Gaberic (FR); Centre National de la Recherche Scientifique, Paris (FR)

( * ) Notice: Subject to any disclaimer, the term of this patent is extended or adjusted under 35 U.S.C. 154(b) by 67 days.

(21) Appl. No.: 11/665,921

(22) PCT Filed: Oct. 18, 2005

(86) PCT No.: PCT/FR2005/002581

§ 371 (c)(1),
(2), (4) Date: Jul. 6, 2009

(87) PCT Pub. No.: WO2006/045923

PCT Pub. Date: May 4, 2006

(65) Prior Publication Data

US 2009/0263724 A1 Oct. 22, 2009

(30) Foreign Application Priority Data

Oct. 22, 2004 (FR) .................................. 04 11243

(51) Int. Cl.
*H01M 4/00* (2006.01)
(52) U.S. Cl. .................... 423/179.5; 423/265; 423/274; 423/414; 428/368; 729/231.2; 977/773; 977/811
(58) Field of Classification Search ............... 423/179.5, 423/265, 274, 414; 428/368; 429/231.2; 977/811, 773
See application file for complete search history.

(56) References Cited

U.S. PATENT DOCUMENTS

| | | | |
|---|---|---|---|
| 5,326,545 A | 7/1994 | Koksbang et al. | |
| 5,334,334 A | 8/1994 | Koksbang | |
| 5,512,214 A * | 4/1996 | Koksbang | ................... 252/506 |
| 2005/0026041 A1 | 2/2005 | Jouanneau | |

FOREIGN PATENT DOCUMENTS

| | | |
|---|---|---|
| FR | 2 831 715 A1 | 5/2003 |
| JP | 1-296567 A | 11/1989 |
| WO | WO 2006/045921 A1 | 5/2006 |

OTHER PUBLICATIONS

Passerini et al., "XAS and electrochemical characterization of lithium intercalated $V_2O_5$ xerogels", Solid State Ionics 90 (1996) 5-14.
Pistoia et al., "Li/$Li_{1+x}V_3O_8$ Secondary Batteries Synthesis and Characterization of an Amorphous Form of the Cathode", Journal of the Electrochemical Society 137 Aug. 1990, No. 8, pp. 2365-2370 Manchester, NH, US, XP 000231200.
International Search Report dated Sep. 28, 2006 (three (3) pages).

* cited by examiner

*Primary Examiner*—Steven Bos
(74) *Attorney, Agent, or Firm*—Merchant & Gould PC

(57) ABSTRACT

The invention relates to a nanostructured material.

The material is a nanostructured carbonaceous material composed of agglomerates of small needles of $Li_{1+\alpha}V_3O_8$ and of $\beta$-$Li_xV_2O_5$ ($0.1 \leq \alpha \leq 0.25$ and $0.03 \leq x \leq 0.667$) surrounded by a noncontinuous layer of spherical carbon particles.

It is obtained by a process consisting in preparing a carbonaceous precursor gel by bringing carbon, $\alpha$-$V_2O_5$ and a Li precursor into contact in amounts such that the ratio of the $[V_2O_5]/[Li]$ concentrations is between 1.15 and 1.5 and that the (carbon)/(carbon+$V_2O_5$+Li precursor) ratio by weight is from 10 to 15 and in subjecting the gel to a heat treatment comprising a 1st stage at 80° C.-150° C. for 3-12 h and a 2nd stage between 300° C. and 350° C. for 10 min to 1 hour, under an nitrogen or argon atmosphere.

Applications: positive electrode active material.

20 Claims, 1 Drawing Sheet

NANOSTRUCTURE MATERIAL, METHOD FOR THE PREPARATION THEREOF

The present invention relates to a process for the preparation of a nanostructured material, to the material obtained and to its use as active material of a positive electrode.

BACKGROUND OF THE INVENTION

Batteries comprising a positive electrode and a negative electrode separated by an electrolyte comprising a lithium salt in solution in a solvent are widely known. The operation of these batteries is provided by the reversible circulation of lithium ions in the electrolyte between the electrodes. The positive electrode is generally composed of a composite material comprising an active material, a binder, a material conferring electron conduction and optionally a compound conferring ionic conduction. The compound conferring electron conduction can be a carbon black which does not catalyze the oxidation of the electrolyte at a high potential.

The use is known, in particular from FR-2 831 715, of a lithium vanadium oxide $Li_{1+\alpha}V_3O_8$ ($0.1 \leq \alpha \leq 0.25$) as positive electrode active material. The use is also known of a $\beta-Li_xV_2O_5$ compound as positive electrode active material in lithium batteries. However, their use in a composite electrode requires the addition of a material conferring electron conduction, for example carbon.

Various attempts have been made to introduce carbon into a positive electrode active material during the preparation of said active material, in order to improve the contacts between the active material and the carbon and consequently the electron conductivity of the composite electrode.

Takashi Watanabe et al. [Solid State Ionics, 151, 1-4, (2002)] describe the preparation of a $V_2O_5 \cdot nH_2O$-carbon nanocomposite by a process comprising the stages of: preparation of a $V_2O_5 \cdot nH_2O$ sol by reaction of aqueous hydrogen peroxide solution with vanadium metal; addition of water and of acetone to the $V_2O_5 \cdot nH_2O$ sol in order to stabilize it; addition of carbon; drying the mixture obtained in order to form an electrode therefrom. The material obtained is composed of carbon grains coated with $V_2O_5 \cdot nH_2O$. However, the good electrochemical performances of the material are obtained only with a very high C/active material ratio by weight, of the order of 1.4, which is extremely unfavorable to any industrial application.

Huan Huang et al. [Angew. Chem. Int. Ed., 2001, 40, No. 20] describe the preparation of a $V_2O_5 \cdot nH_2O$-carbon nanocomposite by a process comprising the following stages: preparation of vanadic acid by passing a solution of sodium metavanadate $NaVO_3$ through an $H^+/Na^+$ ion-exchange column; production of the $V_2O_5 \cdot nH_2O$ xerogel by polycondensation of the vanadic acid; acid treatment of the carbon in order to functionalize the surface; optionally grafting of polyethylene glycol to the pretreated carbon; drying the gel at ambient temperature; dissolution of the xerogel in order to obtain a sol with the help of ultrasound to accelerate the process; mixing the treated carbon and the sol with magnetic stirring until the solvent has completely evaporated. This process requires approximately two days and the tedious and expensive use of an ion-exchange resin. The material obtained is composed of carbon particles coated with $V_2O_5 \cdot nH_2O$. During the preparation of a positive electrode from the nanocomposite, additional carbon is added in a proportion of 10% by weight.

EP-104 918 describes the preparation of a $LiFePO_4$-graphitized carbon nanocomposite in which a thin graphite film coats the surface of the active material. The nanocomposite can be obtained by a 3-stage process: synthesis of $LiFePO_4$; coating of the $LiFePO_4$ grains with a carbonaceous compound which is the precursor of the graphitized carbon; pyrolysis of the coated grains at 700° C. under argon to convert the polymer to conducting graphitized carbon. The nanocomposite can also be obtained in a single stage consisting in carrying out a pyrolysis under argon of a mixture of the $LiFePO_4$ reactants and of the precursor carbonaceous compound. The results show a marked improvement in terms of capacity and of power due solely to a greater effectiveness of the carbon-active material contact. In all cases, 10% by weight of additional carbon is added during the preparation of a composite electrode.

Huang H et al., [Electrochem. Solid State Lett., 4 (10), A170-172 (2001)] and [Adv. Mater., 2002, 14, No. 21, November 4] respectively describe the preparation of $LiFePO_4$-graphitized carbon and $LiV_2(PO_4)_3$-graphitized carbon nanocomposites by a two-stage process. The precursors of the active material are mixed with a carbon gel which results from the polymerization of resorcinol-formaldehyde. A heat treatment at 700° C. under nitrogen for 5 h is necessary to obtain the nanocomposite. Their process results in the grains of the active material being coated with carbon. The use of resorcinol makes the process expensive. In addition, during the preparation of the composite electrode, it is necessary to add additional conducting carbon.

SUMMARY OF THE INVENTION

The aim of the present invention is to provide a simple and inexpensive process for the preparation of a material intimately combining the active material of a positive electrode and carbon giving electron conductivity. The carbon content of the material is in an amount sufficient for said material to be able to be used as electrode material without supplementary addition of a compound conferring electron conduction.

DETAILED DESCRIPTION OF THE PREFERRED EMBODIMENTS

Figure 1:
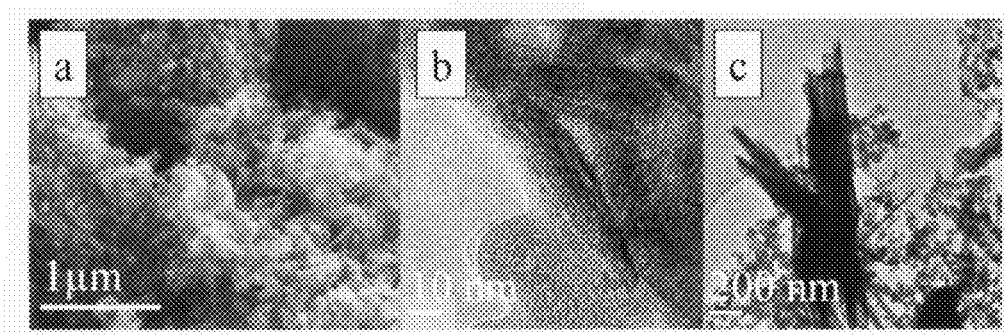
FIG. 1 represents micrographs of the material XC-15a according to the invention (micrographs a and b) and of the material SG350 according to the prior art (micrograph c).

The process according to the present invention consists in preparing a carbonaceous precursor gel and in subjecting said gel to a heat treatment. It is characterized in that:

the precursor gel is prepared by bringing carbon, $\alpha-V_2O_5$ and a Li precursor into contact in amounts such that the ratio of the $[V_2O_5]/[Li]$ concentrations is between 1.15 and 1.5 and that the (carbon)/(carbon+$V_2O_5$+Li precursor) ratio by weight is from 10 to 15%;

the heat treatment is carried out in two stages: a first stage at a temperature of between 80° C. and 150° C. for a time of 3 to 12 hours and a second stage at a temperature of between 300° C. and 350° C. for a time of between 10 min and 1 hour, under a nitrogen or argon atmosphere.

The first stage of the heat treatment can be carried out in air. A time of 6 hours at 90° C. is generally appropriate. If the duration of the second stage of the heat treatment is less than 10 min, residual water remains in the final compound. A time of greater than 1 hour results in an increase in the size of the crystallites which leads to a poorer battery performance.

The first stage of the heat treatment, which produces a xerogel, can be carried out in an oven before introducing the xerogel into the furnace which will be used for the second stage of the heat treatment. The first stage of the heat treatment can also be carried out in the furnace used for the second stage, if the furnace comprises at least two treatment regions, one at the temperature of the first stage and the other at the temperature of the second stage.

In a first embodiment, the Li precursor is $LiOH.H_2O$. $\alpha-V_2O_5$ and $LiOH.H_2O$ are introduced into an aqueous carbon suspension under a nitrogen atmosphere and the gel is formed in approximately 15 h. The concentrations of precursors can vary between 0.75 mol/l and 3 mol/l for $\alpha-V_2O_5$ and between 0.55 mol/l and 2.2 mol/l for $LiOH.H_2O$.

In a second embodiment, an aqueous solution comprising from 10 to 50% by volume of hydrogen peroxide is added to the reaction medium. The gel is then formed in a few minutes. The limiting concentrations which can be used are from 0.05 mol/l to 2 mol/l for $\alpha-V_2O_5$ and from 0.04 mol/l to 1.5 mol/l for the Li precursor.

In the second embodiment:

the lithium precursor can be chosen from $LiOH.H_2O$, $LiCl$, $LiNO_3$ or a lithium salt of a carboxylic acid, for example chosen from lithium acetylacetonate, lithium acetate, lithium stearate, lithium formate, lithium oxalate, lithium citrate, lithium lactate, lithium tartrate or lithium pyruvate;

an aqueous suspension of $\alpha-V_2O_5$ and of carbon is prepared and an aqueous peroxide solution is added thereto, it being possible for the lithium precursor to be introduced into the aqueous suspension of $\alpha-V_2O_5$ and of carbon before the addition of the peroxide solution or after the addition of the peroxide solution, that is to say during the formation of the gel. The gel is observed to begin to form from 3 min after bringing $\alpha-V_2O_5$ and peroxide into contact. The gel is completely formed after maturing for 15 min.

the respective amounts of Li precursor and of $\alpha-V_2O_5$ in the reaction medium are preferably such that $0.08 \text{ mol.l}^{-1} < [Li] < 0.7 \text{ mol.l}^{-1}$; $0.1 \text{ mol.l}^{-1} < [V_2O_5] < 1 \text{ mol.l}^{-1}$. Excessively high concentrations of reactants can bring about effervescence, while excessively low concentrations give precipitates but not gels.

The material obtained by the process of the invention is a nanostructured carbonaceous material composed of agglomerates of small needles of $Li_{1+\alpha}V_3O_8$ and of $\beta-Li_xV_2O_5$ ($0.1 \leq \alpha \leq 0.25$ and $0.03 \leq x \leq 0.667$) surrounded by a noncontinuous layer of spherical carbon particles, in which the $Li_{1+\alpha}V_3O_8$ needles and the $\beta-Li_xV_2O_5$ needles have a length l from 40 to 100 nm, a width w such that $4 < l/w < 100$ and a thickness t such that $4 < l/t < 100$, the spherical carbon particles have a diameter of from approximately 30 nm to 40 nm and form a continuous three-dimensional network, the size of the crystallites constituting the needles is between 50 and 300 Å according to a, 100 and 600 Å according to b and 75 and 450 Å according to c.

In the materials thus defined, there exists an intimate connection at the nanoscopic scale between the $Li_{1+\alpha}V_3O_8$ and $\beta-Li_xV_2O_5$ needles and the spherical carbon particles.

The structure of the composite material proposed can be displayed by different techniques. Scanning Electron Microscopy (SEM) makes it possible to have a general arrangement. Transmission Electron Microscopy (TEM) shows that the carbon coats the grains of active materials with a good contact quality and X-ray diffraction shows that $\beta-Li_xV_2O_5$ is present.

A nanostructured carbonaceous material according to the present invention can be used for the preparation of a composite positive electrode for a lithium battery.

In a particular embodiment, a positive electrode according to the present invention is composed of a composite material which comprises:

a nanostructured carbonaceous compound obtained by the process of the present invention, a binder conferring mechanical strength, optionally a compound conferring ionic conduction.

The content of nanostructuted carbonaceous compound is preferably between 90 and 100% by weight. The content of binder is preferably less than 10% by weight. The content of compound conferring ionic conduction is preferably less than 5% by weight. Preference is very particularly given to the electrodes composed solely of the nanostructured carbonaceous compound and a binder.

The carbon of the nanostructured carbonaceous material of the invention has a triple role of reducing agent, of conductor and of nanostructuring agent. This is because it makes possible the chemical reduction of a portion of the $Li_{1+\alpha}V_3O_8$ phase to give $\beta-Li_xV_2O_5$. It improves the contact of the surface of the grains of active material. Due to the presence of the two constituents $Li_{1+\alpha}V_3O_8$ and $\beta-Li_xV_2O_5$, which are intimately mixed at a nanoscopic scale and the growth of which takes place in situ within the very pores of a network of carbon gains, the size of the domains of active material is reduced and the electron conductor/active material contact surface area is considerably increased in comparison with the material obtained by simple mixing of these three constituents using an $Li_{1+\alpha}V_3O_8$ compound synthesized under identical time and temperature conditions. Consequently, the effectiveness of the conveyance of electrons from the current collector to the active material is improved and the diffusion path of the lithium ions within the grains is reduced.

The binder can be composed of a nonsolvating polymer, of a solvating polymer or of a mixture of solvating polymer and of nonsolvating polymer. It can additionally comprise one or more liquid polar aprotic compounds. The nonsolvating polymer can be chosen from vinylidene fluoride homopolymers and copolymers, copolymers of ethylene, of propylene and of diene, tetrafluoroethylene homopolymers and copolymers, N-vinylpyrrolidone homopolymers and copolymers, acrylonitrile homopolymers and copolymers, and methacrylonitrile homopolymers and copolymers. Poly(vinylidene fluoride) is particularly preferred. The nonsolvating polymer can carry ionic functional groups. Mention may be made, as examples of such a polymer, of polyperfluoroether sulfonate salts, some of which are sold under the name Nafion®, and polystyrene sulfonate salts.

The solvating polymer can be chosen, for example, from polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of ethylene oxide and of epichlorohydrin; and networks obtained by polycondensation and carrying groups which make possible the incorporation of crosslinkable groups.

The polar aprotic compound can be chosen from linear or cyclic carbonates, linear or cyclic ethers, linear or cyclic esters, linear or cyclic sulfones, sulfamides and nitriles.

The compound conferring ionic conduction is a lithium salt advantageously chosen from $LiClO_4$, $LiPF_6$, $LiAsF_6$, $LiBF_4$, $LiR_FSO_3$, $LiCH_3SO_3$, lithium bisperfluoroalkylsulfonimides or lithium bis- or trisperfluorosulfonylmethides.

A composite positive electrode according to the invention can be prepared by mixing the nanostructured carbonaceous material, a binder in an appropriate solvent, and optionally a lithium salt, by spreading the mixture obtained over a metal disk acting as collector (for example an aluminum disk) and by then evaporating the solvent under hot conditions under a nitrogen atmosphere. The solvent is chosen according to the binder used. In addition, a positive electrode can be prepared by extrusion of a mixture of its constituents.

An electrode thus constituted can be used in a battery comprising a positive electrode and a negative electrode separated by an electrolyte comprising a lithium salt in solution in a solvent. The operation of such a battery is provided by the reversible circulation of lithium ions in the electrolyte between the electrodes. One of the subject matters of the present invention is a battery in which the electrolyte comprises a lithium salt in solution in a solvent, characterized in that it comprises a positive electrode comprising, as active material, the nanostructured carbonaceous material prepared according to the process of the present invention. When a positive electrode comprising the nanostructured carbonaceous material as obtained by the process of the invention is fitted into a battery, the battery thus formed is found in the charged state.

In a battery according to the invention, the electrolyte comprises at least one lithium salt in solution in a solvent. Mention may be made, as examples of salts, of $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, $R_F$ representing a perfluoroalkyl group having from 1 to 8 carbon atoms or a fluorine atom.

The solvent of the electrolyte can be composed of one or more polar aprotic compounds chosen from linear or cyclic carbonates, linear or cyclic ethers, linear or cyclic esters, linear or cyclic sulfones, sulfamides and nitriles. The solvent is preferably composed of at least two carbonates chosen from ethylene carbonate, propylene carbonate, dimethyl carbonate, diethyl carbonate and ethyl methyl carbonate. A battery having a polar aprotic solvent electrolyte generally operates in a temperature range from −20° C. to 60° C.

The solvent of the electrolyte can additionally be a solvating polymer. Mention may be made, as examples of solvating polymers, of polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin as disclosed in FR-2 770 034; and networks obtained by polycondensation and carrying groups which make possible the incorporation of crosslinkable groups. Mention may also be made of block copolymers in which some blocks carry functional groups which have redox properties. A battery having a polymeric solvent electrolyte generally operates in a temperature range from 60° C. to 120° C.

In addition, the solvent of the electrolyte can be a mixture of a liquid polar aprotic compound chosen from the polar aprotic compounds mentioned above and of a solvating polymer. It can comprise from 2 to 98% by volume of liquid solvent, depending on whether a plasticized electrolyte with a low content of polar aprotic compound or a gelled electrolyte with a high content of polar aprotic compound is desired. When the polymeric solvent of the electrolyte carries ionic functional groups, the lithium salt is optional.

The solvent of the electrolyte can also be a mixture of a polar aprotic compound as defined above or of a solvating polymer as defined above and of a nonsolvating polar polymer comprising units comprising at least one heteroatom chosen from sulfur, oxygen, nitrogen and fluorine. Such a nonsolvating polymer can be chosen from acrylonitrile homopolymers and copolymers, fluorovinylidene homopolymers and copolymers, and N-vinylpyrrolidone homopolymers and copolymers. In addition, the nonsolvating polymer can be a polymer carrying ionic substituents and in particular a polyperfluoroether sulfonate salt (such as an above-mentioned Nafion®, for example) or a polystyrene sulfonate salt.

In another embodiment, the electrolyte of the battery of the present invention can be an inorganic conducting solid chosen from the compounds generally denoted by Lisicon, that is to say $Li_4XO_4$—$Li_3YO_4$ (X=Si or Ge or Ti; Y=P or As or V), $Li_4XO_4$—$Li_2AO_4$ (X=Si or Ge or Ti; A=Mo or S), $Li_4XO_4$—$LiZO_2$ (X=Si or Ge or Ti; Z=Al or Ga or Cr), $Li_4XO_4$—$Li_2BXO_4$ (X=Si or Ge or Ti; B=Ca or Zn), $LiO_2$—$GeO_2$—$P_2O_5$, $LiO_2$—$SiO_2$—$P_2O_5$, $LiO_2$—$B_2O_3$—$Li_2SO_4$, $LiF$—$Li_2S$—$P_2S_5$, $Li_2O$—$GeO_2$—$V_2O_5$ or $LiO_2$—$P_2O_5$—PON solid solutions. A lithium battery comprising such an electrolyte operates within a very broad temperature range, of the order of −20° C. to 100° C.

Of course, the electrolyte of a battery of the present invention can additionally comprise the additives conventionally used in this type of material and in particular a plasticizer, a filler, other salts, and the like.

The negative electrode of the battery can be composed of lithium metal or a lithium alloy which can be chosen from the alloys β-LiAl, γ-LiAl, Li—Pb (for example $Li_7Pb_2$), Li—Cd—Pb, Li—Sn, Li—Sn—Cd, Li—Sn in various matrices, in particular oxygen-comprising matrices or metal matrices (for example Cu, Ni, Fe or Fe—C), or Li—Al—Mn.

In addition, the negative electrode of the battery can be composed of a composite material comprising a binder and a material capable of reversibly inserting lithium ions at low redox potential (hereinafter denoted by insertion material), said composite material being lithiated during a preliminary stage. The insertion material can be chosen from natural or synthetic carbonaceous materials. These carbonaceous materials can, for example, be a petroleum coke, a graphite, a graphite whisker, a carbon fiber, mesocarbon microbeads, a pitch coke or a needle coke. The insertion material can additionally be chosen from oxides, such as, for example, $Li_xMoO_2$, $Li_xWO_2$, $Li_xFe_2O_3$, $Li_4Ti_5O_{12}$ or $Li_xTiO_2$, or from sulfides, such as, for example, $Li_9Mo_6S_6$ and $LiTiS_2$, or from oxysulfides. Use may also be made of compounds which make it possible to reversibly store lithium at low potential, such as amorphous vanadates (for example $Li_xNiVO_4$), nitrides (for example $Li_{2.6-x}Co_{0.4}N$, $Li_{2+x}FeN_2$ or $Li_{7+x}MnN_4$), phosphides (for example $Li_{9-x}VP_4$), arsenides (for example $Li_{9-x}VAs_4$) and reversibly decomposable oxides (for example CoO, CuO or $Cu_2O$). The binder is an organic binder which is electrochemically stable in the range of operation of the negative electrode. Mention may be made, by way of examples, of poly(vinylidene fluoride) homopolymers or an ethylene/propylene/diene copolymer. A poly(polyvinylidene fluoride) is particularly preferred. A composite negative electrode can be prepared by introducing the carbonaceous compound into a solution of the binder in a polar aprotic solvent, by spreading the mixture obtained over a copper disk acting as collector and by then evaporating the solvent under hot conditions under a nitrogen atmosphere.

A battery according to the invention comprising a solid electrolyte can be provided in the form of a succession of layers composed respectively of the material of the positive electrode according to the invention and its current collector, the solid electrolyte, and the negative electrode and optionally its current collector.

A battery according to the invention comprising a liquid electrolyte can also be provided in the form of a succession of layers composed respectively of the material of the positive electrode according to the invention and its current collector, a separator impregnated by the liquid electrolyte, and the material constituting the negative electrode and optionally its current collector.

The present invention is illustrated in more detail by the examples given below, to which, however, it is not limited.

EXAMPLE 1

Preparation without Peroxide

An aqueous suspension of precursors was prepared by adding 6.8200 g (1.5M) of $\alpha$-$V_2O_5$ and 1.2589 g (1.2M) of $LiOH.H_2O$ to 25 ml of an aqueous suspension comprising 5.18 g of carbon at 50° C. under a nitrogen atmosphere. A gel, hereinafter denoted by GC, was formed after a period of maturing of 15 hours. Subsequently, the GC gel was dried at 90° C. in the air overnight and the xerogel thus obtained was subjected to a treatment at 350° C. under argon for 15 min. The product obtained is hereinafter denoted by XC-15a.

By way of comparison, a compound, hereinafter denoted by SC350, was prepared according to a similar process of the prior art (G. Pistoia et al., *J. Electrochem. Soc.*, 137, 2365 (1990)). The preparation process differs from the process for the preparation of the sample XC-15a, on the one hand because the addition of carbon has been omitted during the gel preparation and, on the other hand, because the xerogel obtained after the drying stage has been subjected to a heat treatment at 350° C. for 10 hours, with a temperature rise gradient of 80° C./h.

FIG. 1 represents micrographs of the material XC-15a according to the invention (micrographs a and b) and of the material SG350 according to the prior art (micrograph c).

The SEM micrograph (a) represents a general arrangement of the material XC-15a. The TEM micrograph (b) shows that the carbon grains coat the $Li_{1+\alpha}V_3O_8$ and $\beta$-$Li_xV_2O_5$ grains with a good contact quality.

The TEM micrograph (c) corresponds to the sample SG350.

Figure 2:
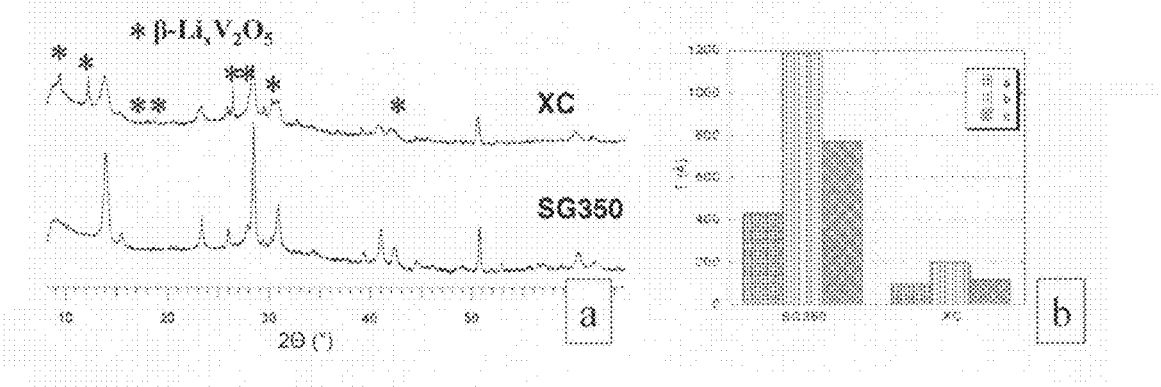
FIG. 2 represents, on the left, X-ray diffraction diagrams and, on the right, a diagram showing the change in the sizes of crystallites in the three crystallographic directions a, b and c for the sample XC-15a according to the invention and for the sample SG350 according to the prior art.

FIG. 2 represents, on the left, X-ray diffraction diagrams and, on the right, a diagram showing the change in the sizes of crystallites in the three crystallographic directions a, b and c for the sample XC-15a according to the invention and for the sample SG350 according to the prior art. The presence of $\beta$-$Li_xV_2O_5$ in the sample XC-15a is demonstrated by the peaks associated with this phase, indicated by *.

The size of the crystallites was determined by analysis of the profile of the X-ray diffraction lines. The diagrams of part b of FIG. 2 show that the material XC-15a of the invention exhibits crystallites which are from 4 to 5 times smaller than the sample SG350 of the prior art, namely 110×180×150 Å for the first cited and 432×118×773 Å for the second.

EXAMPLE 2

Preparation without Peroxide

The preparation process of example 1 was employed but while subjecting the xerogel obtained after drying at 90° C. to a treatment at 350° C. for 1 hour instead of 15 min. The compound obtained is denoted by XC-60.

EXAMPLE 3

Preparation with Peroxide 1 g of $V_2O_5$, 0.1689 g of $LiOH.H_2O$ and 0.1372 g of carbon are added to 15 ml of a 30% aqueous hydrogen peroxide solution. A gel was formed in a few minutes.

The gel obtained was subjected to drying at 90° C. in the air overnight and then to a heat treatment at 350° C. under argon at 15 min.

X-ray diffraction demonstrates the coexistence of the $Li_{1+\alpha}V_3O_8$ and $\beta$-$Li_xV_2O_5$ phases. The SEM and TEM micrographs show that the carbon grains coat the $Li_{1+\alpha}V_3O_8$ and $\beta$-$Li_xV_2O_5$ grains with a good contact quality.

EXAMPLE 4

Measurement of the Performances

The electrochemical performances of the materials XC-15a and XC-60 prepared respectively according to example 1 and example 2 were tested in a Swagelok laboratory battery of the type: Li/liquid electrolyte (EC+DMC+ $LiPF_6$)/(XC), operating at ambient temperature, under cycling conditions corresponding to 1 Li per formula group per 2.5 hours.

Analogous measurements were carried out on the material SG350 to which 5.18 g of carbon have been added.

Figure 3:
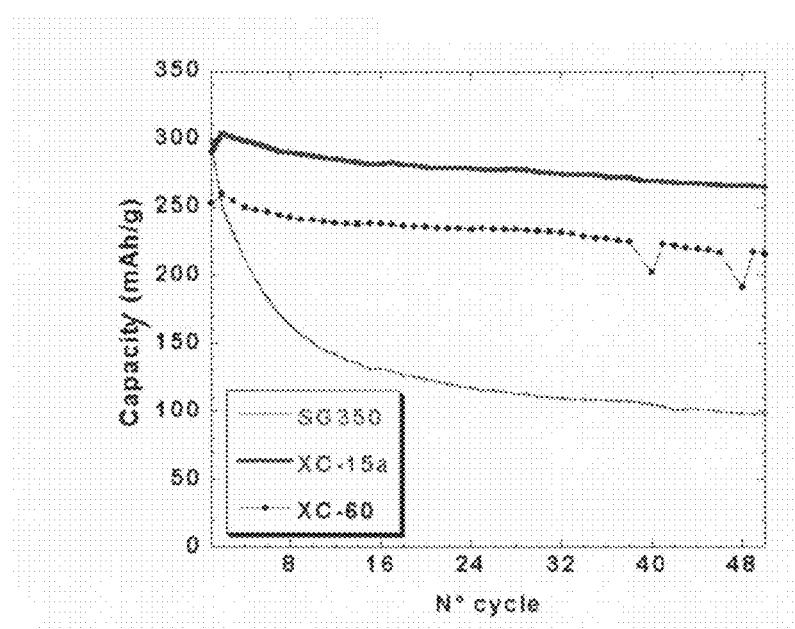
FIG. 3 represents the variation in the capacity for each of the materials.

FIG. 3 represents the variation in the capacity for each of the materials. It is apparent that, after 50 cycles:
- the sample XC-15a has a better retention of cycling capacity than the sample SG350 (87% against 34%);
- the sample XC-60 has a lower initial capacity than the sample SG350 (260 mAh/g against 300 mAh/g) but a better retention of cycling capacity (83% against 34%).

In all the cases, the samples according to the invention have a much higher capacity after 50 cycles than the sample SG350 according to the prior art, namely 265 mAh/g for XC-15a, 215 mAh/g for XC-60 and 100 mAh/g for SG350.

What is claimed is:

1. A process for the preparation of a carbonaceous material comprising preparing a carbonaceous precursor gel and subjecting said gel to a heat treatment, wherein:
   the precursor gel is prepared by bringing carbon, $\alpha$-$V_2O_5$ and a Li precursor into contact in a reaction medium in amounts such that the ratio of the [$\alpha$-$V_2O_5$]/[Li] molar concentrations is between 1.15 and 1.5 and that the (carbon)/(carbon+$\alpha$-$V_2O_5$+Li precursor) ratio by weight is from 10 to 15%; and
   the heat treatment is carried out in two stages: a first stage at a temperature of between 80° C. and 150° C. for a time of 3 to 12 hours and a second stage under a nitrogen or argon atmosphere at a temperature of between 300° C. and 350° C. for a time of between 10 min and 1 hour.

2. The process as claimed in claim 1, wherein:
   the Li precursor is $LiOH.H_2O$; and
   $\alpha$-$V_2O_5$ and $LiOH.H_2O$ are introduced into an aqueous carbon suspension under a nitrogen atmosphere.

3. The process as claimed in claim 2, wherein the concentrations of precursors are between 0.75 mol/l and 3 mol/l for $\alpha$-$V_2O_5$ and between 0.55 mol/l and 2.2 mol/l for $LiOH.H_2O$.

4. The process as claimed in claim 1, wherein an aqueous solution comprising from 10 to 50% by volume of hydrogen peroxide is added to the reaction medium.

5. The process as claimed in claim 4, wherein the concentrations are from 0.05 mol/l to 2 mol/l for α-$V_2O_5$ and from 0.04 mol/l to 1.5 mol/l for the Li precursor.

6. The process as claimed in claim 4, wherein the lithium precursor is $LiOH.H_2O$, LiCl, $LiNO_3$ or a lithium salt of a carboxylic acid.

7. The process as claimed in claim 6, wherein the lithium salt of carboxylic acid is lithium acetylacetonate, lithium acetate, lithium stearate, lithium formate, lithium oxalate, lithium citrate, lithium lactate, lithium tartrate or lithium pyruvate.

8. The process as claimed in claim 4, wherein an aqueous suspension of α-$V_2O_5$ and of carbon is prepared and an aqueous peroxide solution is added thereto, the lithium precursor being introduced into the aqueous suspension of α-$V_2O_5$ and of carbon before the addition of the peroxide solution or after the addition of the peroxide solution.

9. The process as claimed in claim 4, wherein the respective amounts of Li precursor and of α-$V_2O_5$ in the reaction medium are such that $0.08\ mol.l^{-1} < [Li] < 0.7\ mol.l^{-1}$ and $0.1\ mol.l^{-1} < [V_2O_5] < 1\ mol.l^{-1}$.

10. A nanostructured carbonaceous material comprising agglomerates of small needles of $Li_{1+\alpha}V_3O_8$ and of β-$Li_xV_2O_5$ ($0.1 \leq \alpha \leq 0.25$ and $0.03 \leq x \leq 0.667$) surrounded by a noncontinuous layer of spherical carbon particles, wherein
   the $Li_{1+\alpha}V_3O_8$ needles and the β-$Li_xV_2O_5$ needles have a length (l) from 40 to 100 nm, a width (w) such that 4<l/w<100 and a thickness (t) such that 4<l/t<100,
   the spherical carbon particles have a diameter of from approximately 30 nm to 40 nm and form a continuous three-dimensional network, and
   the size of the crystallites constituting the needles is between 50 and 300 Å according to crystallographic direction a, 100 and 600 Å according to crystallographic direction b and 75 and 450 Å according to crystallographic direction c.

11. A composite positive electrode for a lithium battery, operating from −20° C. to 60° C. in combination with a liquid electrolyte or operating from 60° C. to 120° C. in combination with a solid polymer electrolyte, wherein the composite positive electrode comprises a composite material which comprises a nanostructured carbonaceous material as claimed in claim 10.

12. The composite positive electrode as claimed in claim 11, wherein the composite material additionally comprises:
   a binder conferring mechanical strength, and
   optionally a compound conferring ionic conduction.

13. The composite positive electrode as claimed in claim 12, wherein:
   the content of nanostructured carbonaceous compound is between 90 and 100% by weight;
   the content of binder is less than 10% by weight; and
   the content of compound conferring ionic conduction is less than 5% by weight.

14. The composite positive electrode as claimed in claim 13, wherein there is no content of compound conferring ionic conduction.

15. The electrode as claimed in claim 12, wherein the binder comprises a nonsolvating polymer.

16. The electrode as claimed in claim 12, wherein the binder comprises a solvating polymer.

17. The electrode as claimed in claim 12, wherein the binder is a mixture of solvating polymer and of nonsolvating polymer.

18. The electrode as claimed in claim 15, wherein the binder additionally comprises a polar aprotic compound.

19. The electrode as claimed in claim 12, wherein the compound conferring ionic conduction is a lithium salt selected from the group consisting of $LiClO_4$, $LiPF_6$, $LiAsF_6$, $LiBF_4$, $LiR_FSO_3$, $LiCH_3SO_3$, lithium bisperfluoroalkylsulfonimides, lithium bis-perfluorosulfonylmethides, and lithium trisperfluorosulfonylmethides.

20. A battery comprising a negative electrode and a positive electrode separated by an electrolyte comprising a lithium salt in solution in a solvent, wherein the positive electrode is an electrode as claimed in claim 11.

* * * * *